W. M. SMITH.
NUT LOCK.
APPLICATION FILED OCT. 30, 1916.
1,258,264.
Patented Mar. 5, 1918.
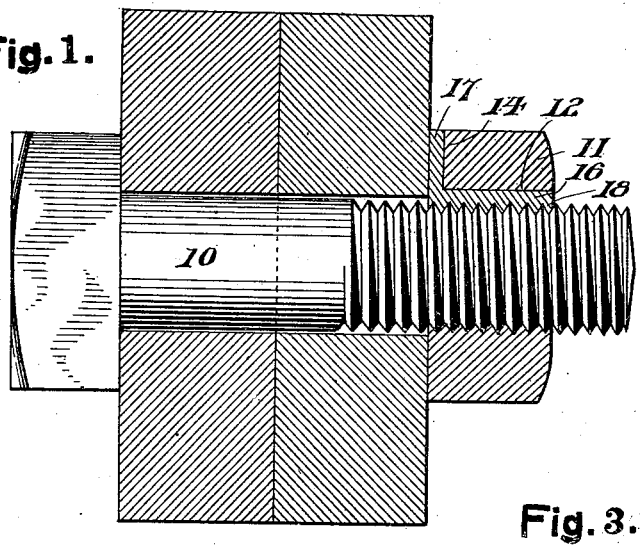
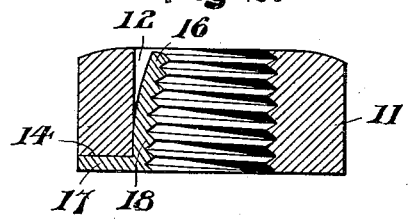
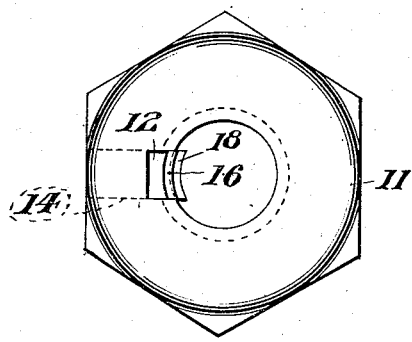
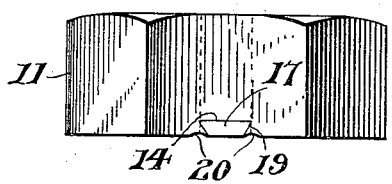
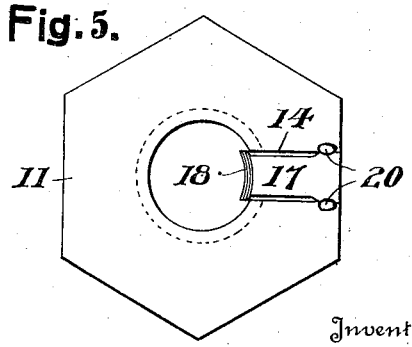
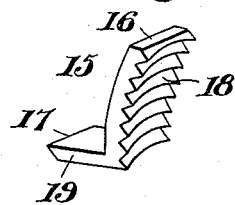
Inventor
W. M. Smith
By A. W. Wilson
Attorney

UNITED STATES PATENT OFFICE.

WILLIAM M. SMITH, OF EAST PITTSBURGH, PENNSYLVANIA.

NUT-LOCK.

1,258,264. Specification of Letters Patent. Patented Mar. 5, 1918.

Application filed October 30, 1916. Serial No. 128,514.

*To all whom it may concern:*

Be it known that I, WILLIAM M. SMITH, a citizen of the United States, residing at East Pittsburgh, in the county of Allegheny and State of Pennsylvania, have invented certain new and useful Improvements in Nut-Locks, of which the following is a specification.

This invention relates to improvements in nut locks and has for its primary object to construct a simple and efficient means for securely retaining a nut in any adjusted position on a bolt and prevent same from turning backward or working loose from its adjusted position when subjected to vibrations.

A practical embodiment of the invention is shown in the accompanying drawings and will be described in detail, it being understood that I do not confine myself to the precise construction, but may vary the same in incidental features, and still be within the scope of the invention as hereinafter claimed.

In the drawings:

Figure 1 is a sectional view showing a nut equipped with my lock in position on a bolt.

Fig. 2 is a cross-sectional view of a nut with the lock therein.

Fig. 3 is a top plan or end view of the nut with the lock therein.

Fig. 4 is a view of the nut in side elevation with the lock fastened in position.

Fig. 5 is a bottom plan or face view of the nut with the lock secured in position, and, Fig. 6 is a perspective view of the locking member detached from the nut.

My invention comprises the providing of a slot or groove throughout the length of the bore of the nut, said slots or grooves receiving a locking member of peculiar formation, one arm or leg of which projects into the bore of the nut and has a threaded face forming a continuation of the threads of the nut, and which arm or leg of the locking member is forced back into its receiving groove as the nut is turned onto the bolt, and which arm or leg further by reason of its spring action is tensioned against the threads of the bolt to securely hold the nut against loosening thereon.

In the accompanying drawing illustrating an embodiment of my invention, 10 designates the bolt and 11 the nut. The bolt is of the usual formation, and to effect a locking of the nut upon the bolt, I provide the nut with a slot 12 extending throughout the length of the nut bore to the periphery of the nut, these two grooves or slots communicating so that a substantially L-shaped groove or slot is provided in the nut, one leg of which lies within the nut and the other or shorter leg of which lies within the outer face of the nut.

This L-shaped groove or slot that is thus provided in the nut receives a locking member designated generally as 15 in Fig. 6, comprising a relatively long arm or leg 16 and a relatively short arm or leg 17, the latter arm or leg being received in the slot or groove 14, while the longer arm or leg 16 is received in the slot or groove 12. The said arm or leg 16 of the locking member has a concaved outer face provided with threads 18 which constitute continuations of the threads on the nut bore that have been cut away by the formation of the slot or groove 12. At the juncture of the arm or leg 16 with the arm or leg 17, the said two arms or legs are at direct right angles to each other. The arm or leg 16 however, at a point slightly above or beyond the juncture of the two arms or legs is curved outwardly so that the major portion of said arm or leg 16 normally projects outwardly into the bore of the nut, as best seen in Fig. 2 of the drawings.

The locking member may be secured in the nut in any desired manner. In the present illustration of the invention, it is shown with the side edges of the arm or leg 17 inclined or beveled as at 19, and the material of the nut along the side walls of the slot 14 is upset as at 20 whereby to lock the arm or leg 17 within the slot or groove 14.

As the threads 18 at the base of the locking member form continuations of the nut threads at this end of the nut, it will be observed that the nut may be readily started onto the end of the bolt, and as the nut is turned on, the successive threads of the locking member engaging the bolt will gradually force the curved spring arm or leg 16 back into the slot or groove 12 until such time as the said arm or leg lies wholly within the slot or groove as illustrated in Fig. 1 of the drawings, the arm or leg 16 exerting a tension at all times against the threads of the bolt so as to securely lock the nut in position thereon.

Attention is called to the fact that the device may be easily applied to the ordinary nut by simply grooving the latter to provide the locking member seat, in which the locking member can be inserted and secured in the manner herein shown or other desired means. It will be obvious that the lock as described may be used in connection with any form of work to which a nut can ordinarily be applied.

What I claim as new is:—

1. In a nut lock, a bolt and a nut, the nut having a longitudinal groove extending throughout the length of the threaded bore of the nut on one side of the latter and having a transverse communicating groove across the inner face, and a removable locking member having a long and a short arm received in said grooves and remaining at all times within the boundary of the nut, the longer of said arms having a concaved thdeaded outer face and having its free end curved outwardly to lie normally in the nut bore.

2. In combination, a nut having a threaded bore and a groove extending throughout the length of the bore, a removable locking member secured to the nut and remaining at all times within the boundary of the nut and having a spring arm provided with a threaded concave outer face, the threads on said face forming a continuation of the nut threads at the grooved portion of the nut, the outer free end of said arm normally projecting into the nut bore and adapted to be compressed within the groove by turning the nut onto a bolt.

3. A lock nut having a threaded bore, communicating longitudinal and transverse recesses in said nut, and a removable bolt-engaging element positioned in said recesses and located at all times within the boundary of said nut, the locking element being of resilient material and having a normal tendency to extend inwardly of the bore of the nut.

4. A lock nut having a threaded bore, the nut having a longitudinal recess communicating with the bore thereof, a transverse recess formed in the inner face of the nut and in communication with the longitudinal recess, and a substantially L-shaped bolt-engaging member removably positioned within said recesses and located at all times within the boundary of said nut.

5. A lock nut having a threaded bore, the nut having a longitudinal recess communicating with the bore thereof, a transverse recess formed in the inner face of the nut and in communication with the longitudinal recess, and a substantially L-shaped bolt-engaging member removably positioned within said recesses and located at all times within the boundary of said nut, the engaging side walls of the short leg of the L-shaped locking member and the transverse recess being constructed to prevent relative movement of the shorter leg of the locking member and the nut.

In testimony whereof I affix my signature.

WILLIAM M. SMITH.

Copies of this patent may be obtained for five cents each, by addressing the "Commissioner of Patents, Washington, D. C."